(12) United States Patent
Grivas et al.

(10) Patent No.: US 7,062,286 B2
(45) Date of Patent: Jun. 13, 2006

(54) CONVERSION OF CALLS FROM AN AD HOC COMMUNICATION NETWORK

(75) Inventors: Nick B. Grivas, Harvard, IL (US); Raymond L. Sokola, Long Grove, IL (US); Michael A. Newell, Williams Bay, WI (US); Robert Faust D'Avello, Lake Zurich, IL (US); Jerome D. Meyerhoff, Buffalo Grove, IL (US); James A. Van Bosch, Crystal Lake, IL (US); Scott B. Davis, Walworth, WI (US)

(73) Assignee: Motorola, Inc., Schaumburg, IL (US)

( * ) Notice: Subject to any disclaimer, the term of this patent is extended or adjusted under 35 U.S.C. 154(b) by 25 days.

(21) Appl. No.: 10/818,267

(22) Filed: Apr. 5, 2004

(65) Prior Publication Data
US 2005/0221851 A1    Oct. 6, 2005

(51) Int. Cl.
*H04B 7/00*     (2006.01)
*H04Q 7/20*     (2006.01)

(52) U.S. Cl. .................. 455/518; 455/519; 455/414.4; 455/416

(58) Field of Classification Search ................ 455/517, 455/518, 519, 520, 500, 414.1, 414.4, 416, 455/458
See application file for complete search history.

(56) References Cited

U.S. PATENT DOCUMENTS

| 4,817,190 A | * | 3/1989 | Comroe et al. ............. 455/11.1 |
| 5,126,733 A | | 6/1992 | Sagers et al. |
| 5,214,790 A | | 5/1993 | Kozlowski et al. |
| 5,235,631 A | | 8/1993 | Grube et al. |
| 5,471,646 A | | 11/1995 | Schultz |
| 5,511,232 A | | 4/1996 | Odea et al. |
| 5,530,914 A | | 6/1996 | McPheters |
| 5,535,426 A | | 7/1996 | Leigh et al. |
| 5,542,108 A | | 7/1996 | Sasuta |
| 5,758,291 A | | 5/1998 | Grube et al. |
| 5,870,149 A | | 2/1999 | Comroe et al. |

(Continued)

OTHER PUBLICATIONS

Emerging Wireless Technologies, Emerging Wireless Services Assessment, May 2002, 5 pages.

*Primary Examiner*—Edan Orgad
(74) *Attorney, Agent, or Firm*—Thomas V. Miller; Terri S. Hughes

(57) ABSTRACT

An improved system and procedure for allowing participants within a group conversation on a wireless communication network to at least temporarily break away from a group conversation and hold a side bar conversation. The side bar conversation may comprise several different types, including a public conversation (much like the original group conversation) or may constitute a private conversation (much like a standard phone call) or private text messaging or data exchange. A group conversation user wishing to hold the side bar conversation uses his user interface to alert other group conversation user(s) with whom he would like to hold the side bar conversation. Either the initiating user or the recipient user(s) can recommend the type of side bar conversation to be had using their user interfaces. If the side bar conversation is a voice conversation, the original group conversation can still be audible in the back ground, but can be reduced in volume relative to the side bar conversation or squelched in and out when the side bar conversation is active. If desired, side bar participants can rejoin the original group conversation by selecting such an option from their user interfaces.

42 Claims, 8 Drawing Sheets

U.S. PATENT DOCUMENTS

| | | |
|---|---|---|
| 5,884,196 A | 3/1999 | Lekven et al. |
| 5,912,882 A | 6/1999 | Yafuso et al. |
| 5,960,362 A | 9/1999 | Grob et al. |
| 5,983,099 A | 11/1999 | Yao et al. |
| D424,052 S | 5/2000 | Haile et al. |
| 6,141,347 A | 10/2000 | Shaughnessy et al. |
| 6,275,500 B1 | 8/2001 | Callaway, Jr. et al. |
| 6,360,093 B1 | 3/2002 | Ross et al. |
| 6,366,782 B1 * | 4/2002 | Fumarolo et al. ........... 455/457 |
| 6,373,829 B1 | 4/2002 | Vilmur |
| 6,516,200 B1 | 2/2003 | Schmidt et al. |
| 6,647,270 B1 | 11/2003 | Himmelstein |
| 2002/0102999 A1 * | 8/2002 | Maggenti et al. ........... 455/518 |
| 2003/0016632 A1 * | 1/2003 | Refai et al. ................. 370/260 |
| 2003/0065427 A1 | 4/2003 | Funk |
| 2003/0083086 A1 | 5/2003 | Toyryla |
| 2003/0100326 A1 | 5/2003 | Grube |
| 2004/0196826 A1 * | 10/2004 | Bao et al. .................... 370/352 |
| 2005/0113122 A1 * | 5/2005 | Korneluk .................... 455/518 |

\* cited by examiner

CONVERSION OF CALLS FROM AN AD HOC COMMUNICATION NETWORK

The present application is related to the following, commonly assigned patent applications, which were filed concurrently herewith and incorporated by reference in their entirety:

U.S. Ser. No. 10/818,077, entitled "Selectively Enabling Communications at a User Interface Using a Profile," filed concurrently herewith.

U.S. Ser. No. 10/818,109, entitled "Method for Enabling Communications Dependent on User Location, User-Specified Location, or Orientation," filed concurrently herewith.

U.S. Ser. No. 10/818,078, entitled "Methods for Sending Messages Based on the Location of Mobile Users in a Communication Network," filed concurrently herewith.

U.S. Ser. No. 10/818,000, entitled "Methods for Displaying a Route Traveled by Mobile Users in a Communication Network," filed concurrently herewith.

U.S. Ser. No. 10/818,381, entitled "Method for Entering a Personalized Communication Profile Into a Communication User Interface," filed concurrently herewith.

U.S. Ser. No. 10/818,079, entitled "Methods and Systems for Controlling Communications in an Ad Hoc Communication Network," filed concurrently herewith.

U.S. Ser. No. 10/818,299, entitled "Methods for Controlling Processing of Inputs to a Vehicle Wireless Communication Interface," filed concurrently herewith.

U.S. Ser. No. 10/818,080, entitled "Methods for Controlling Processing of Outputs to a Vehicle Wireless Communication Interface," filed concurrently herewith.

U.S. Ser. No. 10/818,076, entitled "Programmable Foot Switch Useable in a Communications User Interface in a Vehicle," filed concurrently herewith.

FIELD OF THE INVENTION

This invention in general relates to systems and methods for allowing participants within a group conversation on a wireless communication network to at least temporarily break away from the group conversation and hold a side bar conversation.

BACKGROUND OF THE INVENTION

Communication systems, and especially wireless communication systems, are becoming more sophisticated, offering consumers improved functionality to communicate with one another. Such increased functionality has been particularly useful in the automotive arena, and vehicles are now being equipped with communication systems with improved audio (voice) wireless communication capabilities. For example, On Star™ is a well-known communication system currently employed in vehicles, and allows vehicle occupants to establish a telephone call with others (such as a service center) by activating a switch.

However, existing communications schemes lack flexibility to tailor group communications and allow users to dynamically move between other subgroup communications. For instance, existing approaches depend heavily on establishing communication from one end of a communication (namely, a service center) and do not provide means for all parties to dynamically change the nature of the communications or the definition of the group. This lack of flexibility may prohibit group users from communicating as freely as they might wish.

A need exists for more flexibility in wireless communications, especially in the automotive environment. For instance, suppose a cellular network establishes a call involving four users within a group. A first participant may during the call propose a solution to a given business problem. Suppose a second user disagrees with this solution, and wishes to consult a third user. Obviously, if the second user expresses his disagreement, his disagreement will be broadcast to the entire group, including the first user whose solution is being criticized. One option would be for the second and third users to mute the existing group call and then establish a separate communication link using different devices to discuss the issue further. This may be undesirable if the users are operating a vehicle or do not want to wish to use multiple communication devices.

In short, while existing group communications have some utility, room for improvement exists to allow communications within the group to be tailored so that subgroup or side bar communications can be had. This disclosure presents several different means for doing this.

It is, therefore, desirable to provide an improved procedure for allowing participants within a group conversation on a wireless communication network, especially in the automotive environment, to at least temporarily break away from the group conversation and hold a side bar conversation.

Figure 1:
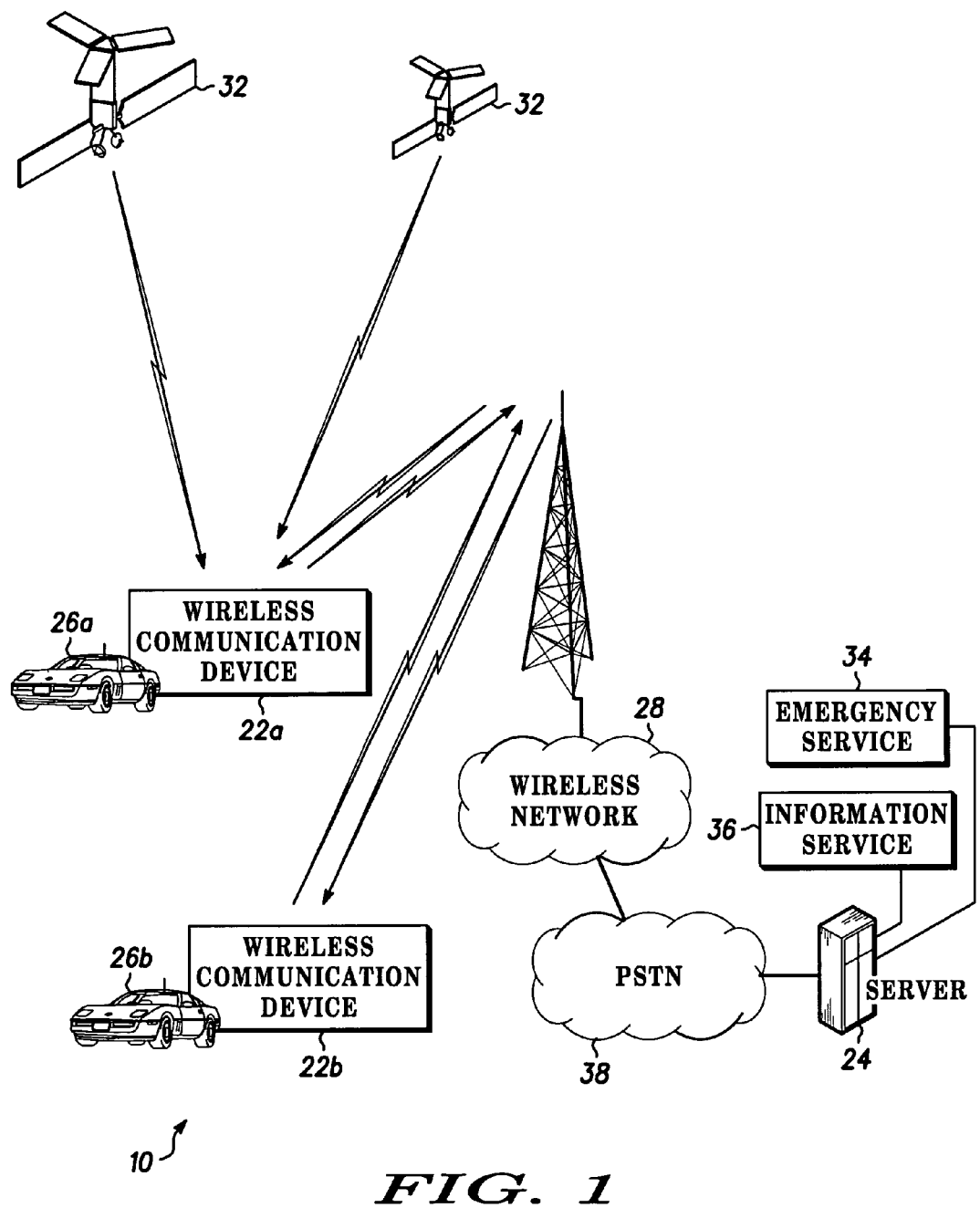
FIG. 1 is a block diagram of a wireless vehicular communications system.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is an improved system and procedure for allowing participants within a group conversation on a wireless communication network to at least temporarily break away from a group conversation and hold a side bar conversation. The side bar conversation may comprise several different types, including a public conversation (much like the original group conversation) or may constitute a private conversation (much like a standard phone call) or private text messaging or data exchange. A group conversation user wishing to hold the side bar conversation uses his user interface to alert other group conversation user(s) with whom he would like to hold the side bar conversation. Either the initiating user or the recipient user(s) can recommend the type of side bar conversation to be had using their user interfaces. If the side bar conversation is a voice conversation, the original group conversation can still be audible in the back ground, but can be reduced in volume relative to the side bar conversation or squelched in and out when the side bar conversation is active. If desired, side bar participants can rejoin the original group conversation by selecting such an option from their user interfaces.

Now, turning to the drawings, an example use of the present invention in an automotive setting will be explained. FIG. 1 shows an exemplary vehicle-based communication system 10. In this system, vehicles 26 are equipped with wireless communication devices 22, which will be described in further detail below. The communication device 22 is capable of both transmitting and receiving voice (i.e., speech), data (such as textual or SMS data), and/or video. Thus, device 22 can wirelessly transmit or receive any of these types of information to a transceiver or base station coupled to a wireless network 28. Moreover, the wireless communication device may receive information from satellite communications. Ultimately, the network may be coupled to a public switched telephone network (PSTN) 38, the Internet, or other communication network on route to a service center having a server 24, which ultimately acts as the host for communications on the communication system 10 and may comprise a communications server. As well as administering communications between vehicles 26 wirelessly connected to the system, the server 24 can provide other services to the vehicles 26, such as emergency services 34 or other information services 36 (such as restaurant services, directory assistance, etc.).

Figure 2:
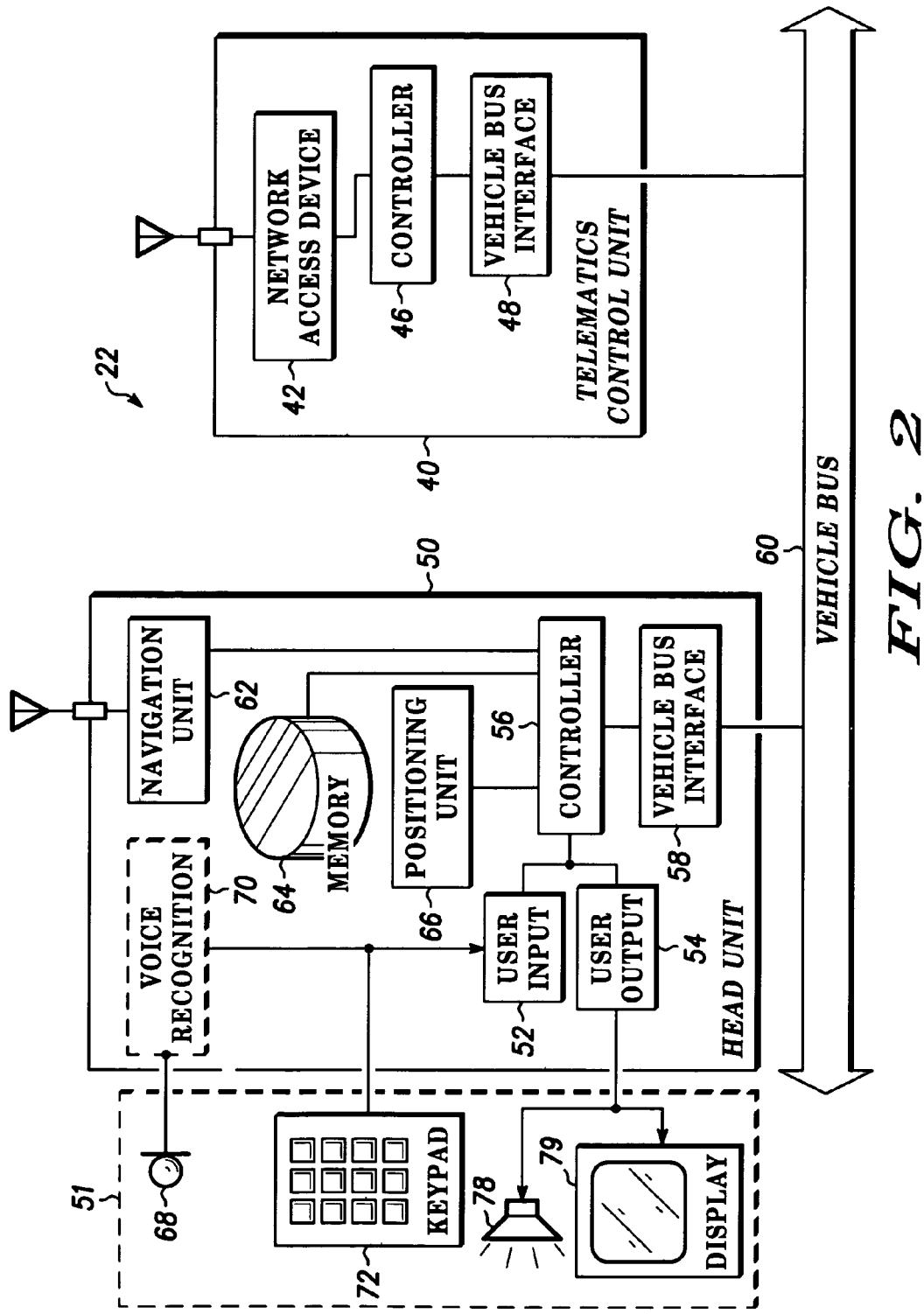
FIG. 2 is a block diagram of a control system for a vehicular wireless communications system.

Further details of the wireless communications device 22 as employed in a vehicle 26 are shown in FIG. 2. In one embodiment, the device 22 is comprised of two main components: a head unit 50 and a Telematics control unit 40. The head unit 50 interfaces with or includes a user interface 51 with which the vehicle occupants interact when communicating with the system 10 or other vehicles that are wirelessly coupled to the system. For example, a microphone 68 can be used to pick up a speaker's voice in the vehicle, and/or possibly to give commands to the head unit 50 if it is equipped with a voice recognition module 70. A keypad 72 may also be used to provide user input, with switches on the keypad 72 either being dedicated to particular functions (such as a push-to-talk switch, a switch to receive mapping information, etc.) or allowing for selection of options that the user interface provides.

The head unit 50 can also comprises a navigation unit 62, which typically includes a Global Positioning Satellite (GPS) system for allowing the vehicle's location to be pinpointed, which is useful, for example, in associating the vehicle's location with mapping information the system provides. As is known, such a navigation unit communicates with GPS satellites (such as satellites 32) via a receiver. Also present is a positioning unit 66, which determines the direction in which the vehicle is pointing (north, north-east, etc.), and which is also useful for mapping a vehicle's progress along a route.

Ultimately, user and system inputs are processed by a controller 56 which executes processes in the head unit 50 accordingly, and provides outputs 54 to the occupants in the vehicle, such as through a speaker 78 or a display 79 coupled to the head unit 50. The speakers 78 employed can be the audio (radio) speakers normally present in the vehicle, of which there are typically four or more, although only one is shown for convenience. Moreover, in an alternative embodiment, the output 54 may include a text to speech converter to provide the option to hear an audible output of any text that is contained in a group communication channel that the user may be monitoring. This audio feature may be particular advantageous in the mobile environment where the user is operating a vehicle. Additionally, a memory 64 is coupled to the controller 56 to assist it in performing regulation of the inputs and outputs to the system. The controller 56 also communicates via a vehicle bus interface 58 to a vehicle bus 60, which carries communication information and other vehicle operational data throughout the vehicle.

The Telematics control unit 40 is similarly coupled to the vehicle bus 60, via a vehicle bus interface 28, and hence the head unit 50. The Telematics control unit 40 is essentially responsible for sending and receiving voice or data communications to and from the vehicle, i.e., wirelessly to and from the rest of the communications system 10. As such, it comprises a Telematics controller 46 to organize such communications, and a network access device (NAD) 42 which include a wireless transceiver. Although shown as separate components, one skilled in the art will recognize that aspects of the head unit 50 and the Telematics control unit 40, and components thereof, can be combined or swapped.

The wireless communications device 22 can provide a great deal of communicative flexibility within vehicle 26. For example, an occupant in a first vehicle 26a can call a second vehicle 26b to speak to its occupants either by pressing a switch on the keypad 72 of the head unit 50 or by simply speaking if the head unit is equipped with a voice recognition module 70. In one embodiment, the pressing of a switch or speaking into a voice recognition module initiates a cellular telephone call with a second vehicle 26b. In this case, users in either the first vehicle 26a or the second vehicle 26b can speak with each other without pressing any further switches. Moreover, the system may be configured to include a voice activated circuit such as a voice activated switch (VAS) or voice operated transmit (VOX). This would also provide for hands-free operation of the system by a user when communicating with other users.

In an alternative embodiment, the switch may be configured to establish a push-to-talk communication channel over a cellular network. Here, the controller 56 is configured to only allow audio by occupants in the first vehicle 26a through microphone 68 to be transmitted through the Telematics control unit 40 when a user in the first vehicle 26a is pressing down on the push-to-talk switch. The controller 56 is further configured to only allow audio received from the second vehicle 26b (or server 24) to be heard over speakers 78 when the operator of the first vehicle 26a is not pressing down on the switch. Alternatively, to avoid the need of holding down a switch to speak, the system may be configured to allow a user to push a button a first time to transmit audio and push the button a second time to receive audio.

In any event, a user in the second vehicle 26b can, in like fashion, communicate back to the first vehicle 26a, with the speaker's voice being heard on speaker(s) 78 in the first vehicle or converted to text and shown on display 79. Or, an occupant in the first vehicle 26a can call the service center and server 24 to receive services. Additionally, such a system 10 can have utility outside of the context of vehicle-based applications, and specifically can have utility with respect to other portable devices (cell phones, personal data assistants (PDAs), etc.). The use of the system in the context of vehicular communications is therefore merely exemplary.

System 10 can be used by a vehicle user to engage in group conversations, in what we will refer to as an "ad hoc" communication network. In such an application, a plurality of users in communication with the system may join into a public conversation. In such a system, a subset of users would be predefined by a system user to form a communication group, such as a family group, a professional work group, etc. Once predefined, any of those predefined users would be able to speak with other predefined users, for example, by pressing a push-to-talk button on their user interfaces, which again may constitute a dedicated vehicular user interface. All other users in the predefined group will hear the voice of the speaking user, and in turn all users may likewise speak with the rest of the users in the group by pressing the buttons on their user interfaces.

Figure 3:
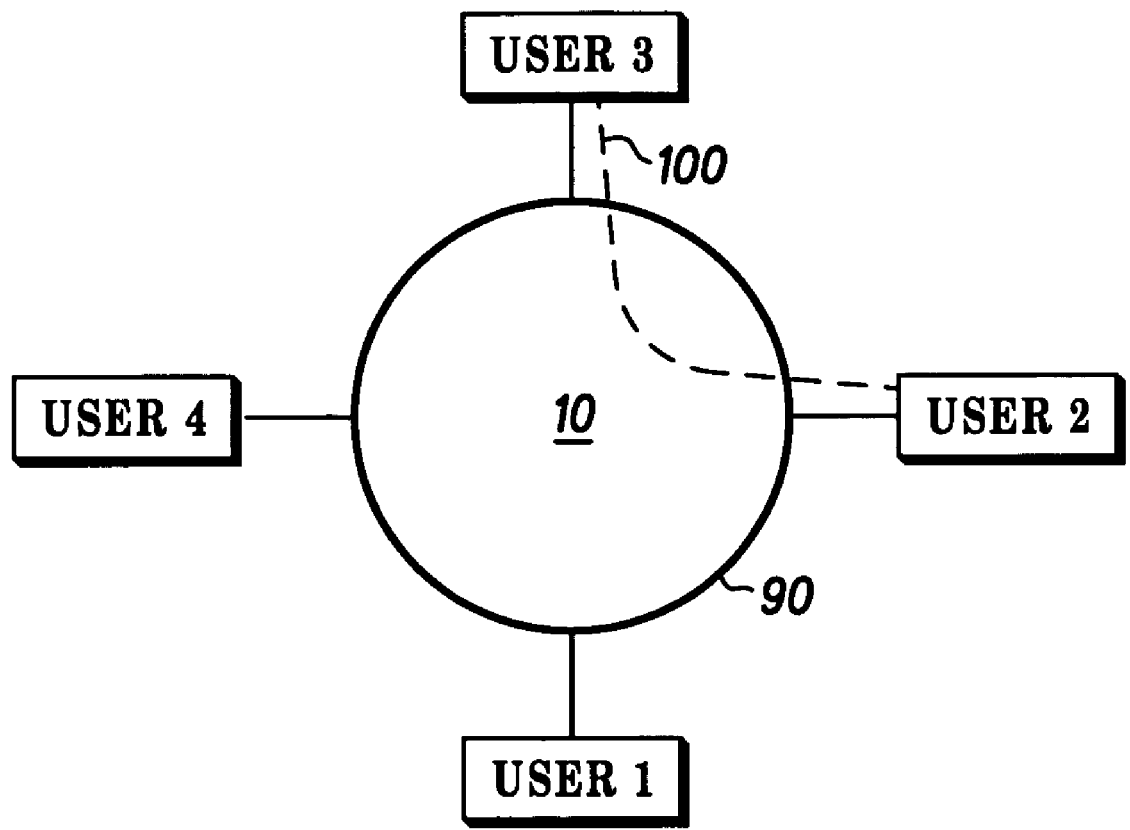
FIG. 3 is diagram illustrating multiple users participating in a group conversation, and two users wishing to have a side bar conversation.

FIG. 3 illustrates the four users communicating in a group conversation 90 using a communication network 10. Of course, more or less than four users may participate in such a group conversation and illustration of four such users is merely exemplary. In this example, suppose user 2 wishes to privately contact user 3 to have a side bar conversation 100 to which the other users (users 1 and 4) do not have access. As illustrated in further detail herein, such a side bar conversation 100 can be formulated in a number of different ways: it may be a completely separate conversation between the second and third users completely divorced from the original group conversation 90; or it may still retain some connection to the original group conversation 90. In the latter circumstance, the second and third users may still hear the original group conversation 90 in the background of their side bar conversation 100, perhaps with diminished volume, or squelched to prioritize the side bar conversation, and may be allowed to rejoin the original group conversation 90 once their side bar conversation is completed.

Figure 4:
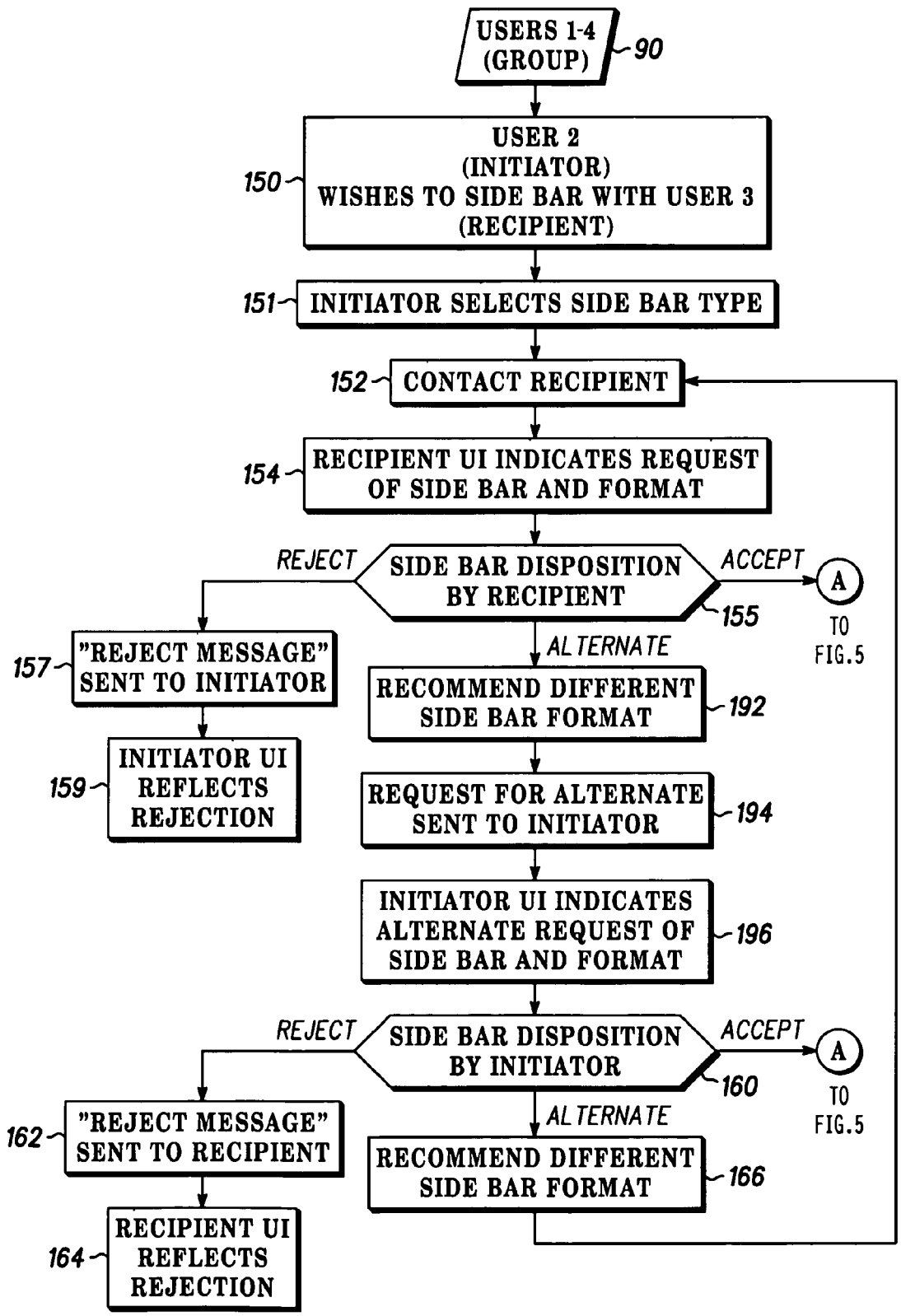
FIG. 4 is a flow diagram describing how a user, from a group conversation, can initiate and hold a side bar conversation with another group conversation user.

A basic flow diagram illustrating several means for initiating and holding a side bar conversation 100 is illustrated in FIG. 4. From the original group conversation 90, user 2 (initiator) can decide to set up a side bar conversation 100 with user 3 (recipient). As we will see further in this disclosure, there are several different types of side bar conversations 100 that the users 2 and 3 may have, and accordingly, at process block 151 the initiator is allowed to select one of these types of side bar communications. However, in one embodiment, the recipient may also choose to accept the side bar, reject, or recommend an alternate type which may be more sensible because user 3 is in a better position to know what types of side bar conversations he is capable of participating in at a given time. Thus, as explained further below, FIG. 4 provides a feature for the recipient to recommend an alternate type of side bar communication and that alternate type can be communicated to the initiator.

In any event, initially, process block 151 illustrates that the user 2 (initiator) may request a side bar conversation 100 with user 3 (recipient) by selecting a type of side bar communication. This may include, among other things, a public (or new group) communication or a private communication. These types may further include a choice of between a voice call, a SMS text messaging service or other data exchange means. Next, the process may include contacting the recipient (block 152) and alerting the recipient through the user interface of the desired side bar type and format (block 154). Such an alert and request can be achieved in a number of different ways, and one such way is shown in FIG. 6.

Figure 6:
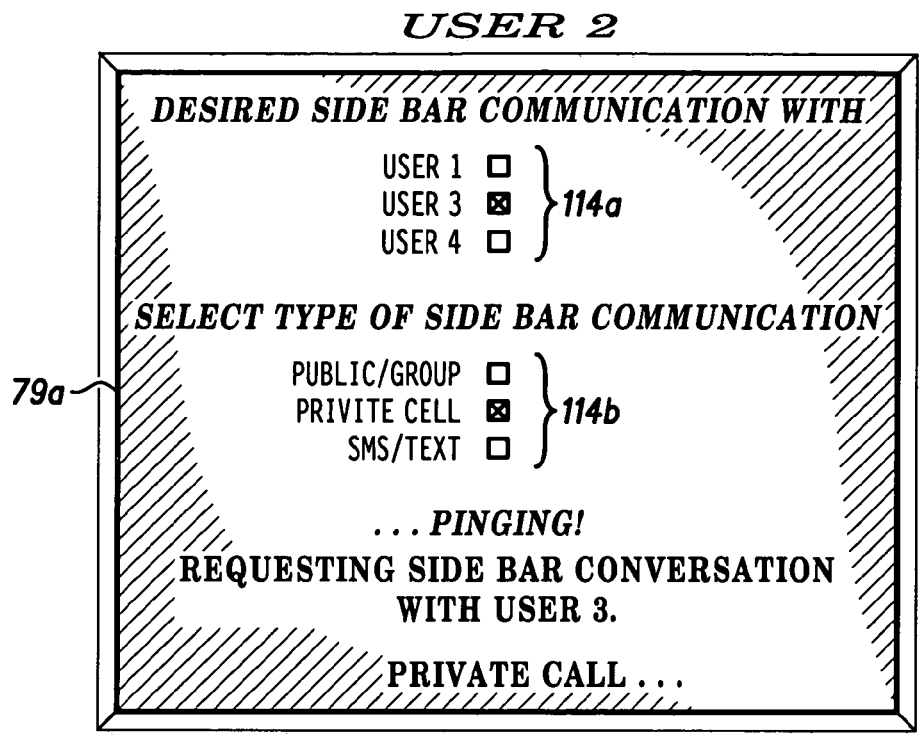
FIG. 6 is a diagram of displays in a user interface that illustrate how one user can request the side bar conversation and how the other user can accept such a request.
Figure 6:
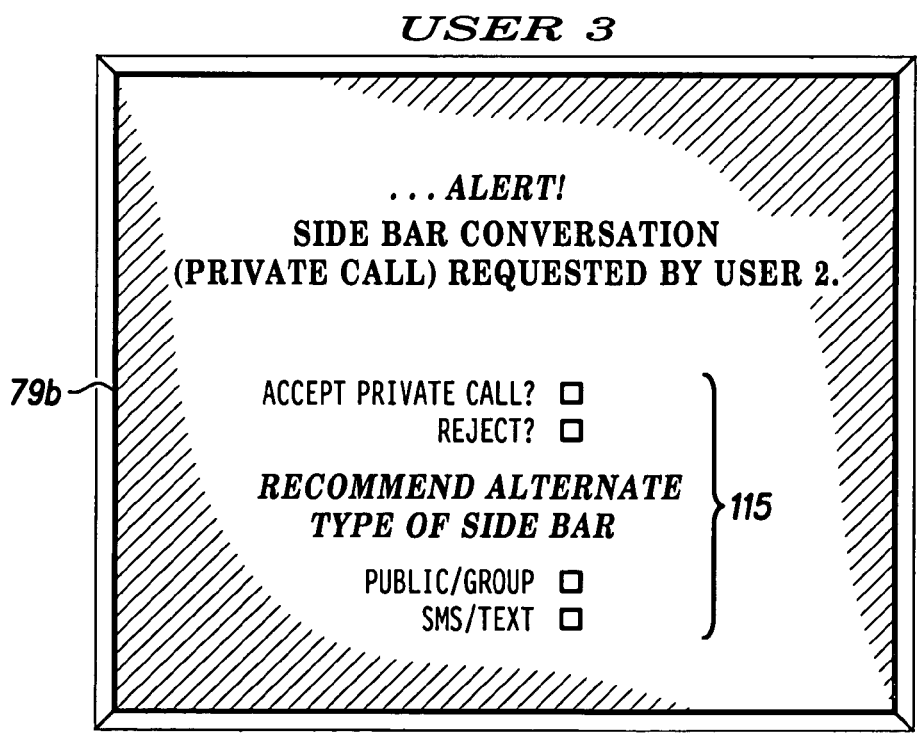

FIG. 6 illustrates one embodiment of a display 79a for an initiator (user 2) and a display 79b for the recipient (user 3). The display 79a for the initiator may show all users currently connected on the call. This is possible because each user joined to the call can have the head unit 50 in his user interface transfer his system ID code to the server 24 so that the server can appropriately manage the group call. Many different styles of user ID codes can be used by the system, such as a phone number, a user name "handle," a Vehicle Identification number (VIN), an Electronic Serial Number (ESN), an International Mobile Subscriber Number (IMSI), or a Mobile Subscriber International ISDN Number (MSISDN), all of which are referred to herein as "user IDs" for convenience. As one skilled in the art understands, a user's user ID may be included in a data header which accompanies the transfer of data from the user (such as audio data), which may be predictably formatted so that it is understandable by the server 24 and relevant other users.

Along with displaying other users, the initiator's display 79a, in one embodiment, has selectable buttons 114a, 114b. Buttons 114a, 114b may be located elsewhere on the user interface, but are illustrated in FIG. 6 as touch screen buttons. Alternatively, the system may select users through a voice activation system if the vehicle is equipped with a voice recognition controller 70. In any event, in a system with touch screen buttons, a user such as user 2 (initiator) may, using buttons 114a, select particular users with which to have a side bar conversation 100 (114a) and, using buttons 114b, choose the desired type of conversation. After making such a selection, the initiator's request is transmitted to the server 24, at which time the server 24 discerns the intended recipient(s) (and the recommended side bar type) from the data header. Thereafter, the server 24 communicates to user 3 (recipient) an alert by transmitting to those recipients (in this case user 3) a notification of the requested side bar conversation 100 (and recommended side bar type).

Referring back to FIG. 4, at decision block 155, the recipient may then reject or accept the notification, or may recommend an alternate side bar format as illustrated again through the user of touch screen buttons on FIG. 6. For instance, the recipient (here, user 3) may, using buttons 115, make a decision to accept the side bar conversation, reject the side bar conversation, or accept the conversation but recommend a new type or format. In the process flow of FIG. 4, if the decision is to reject the side bar conversation, the process proceeds to block 157 where the server 24 will send a rejection message back to the initiator's communication device and, at block 159, the initiator's user interface will then reflect the rejection.

In one embodiment, decision block 155 also accommodates a situation where the recipient would like to accept the side bar communication but desires a different type or format for the side bar communication. Thus, if the initiator's choice of the type or format of communication is not acceptable to the recipient, then the process moves to block 192 where the recipient may propose an alternate type of communication. In block 194, the proposed alternate type of communication will then be sent back to the initiator (here, user 2). At block 196, this alternate proposal is displayed to the initiator on the user interface. The process will proceed to decision block 160 where the initator may decide to accept the alternate type as proposed.

Similar to decision block 155, the decision block 160 allows the initiator to reject or accept the notification, or to recommend an alternate side bar format. If the initiator rejects the recipients new proposed side bar type, the process may then proceed to block 162 where a rejection message is sent to the recipient and, in block 164, the recipient's user interface reflects the rejection. The process at this point may terminate the request or, alternatively, default back to the initiator's proposed type of side bar communication. Referring back to decision block 160, if the initiator recommends an alternate side bar format then the process may proceed to block 166 where the recommended type of the initiator is selected and process continues back to process block 152 as described above.

Figure 5:
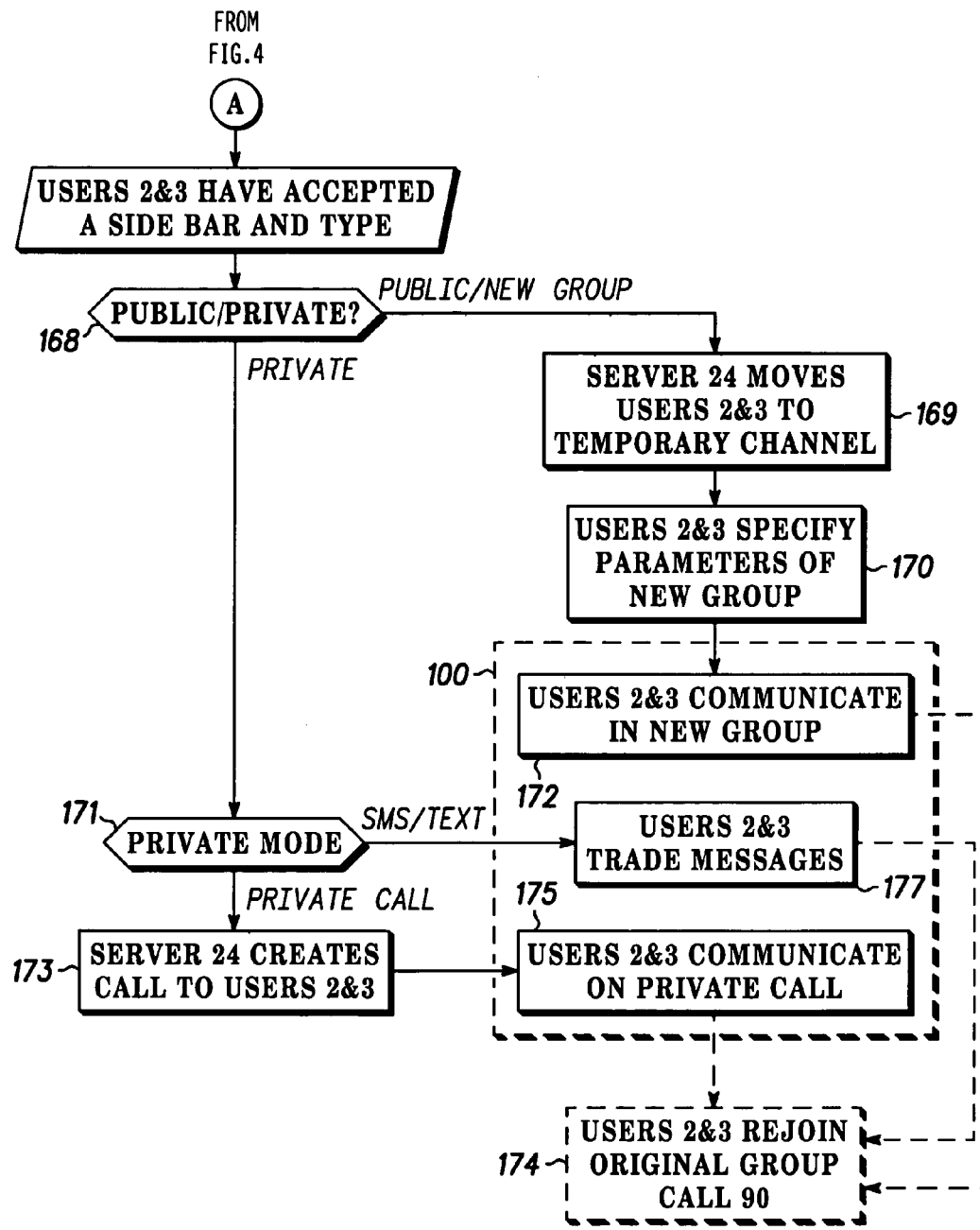
FIG. 5 is a flow diagram after the side bar has been accepted by the participants.

When the parties select a type of side bar communication, in either decision block 155 or decision block 160, the process may proceed to the flow diagram in FIG. 5. FIG. 5 illustrates one way that a system may process different types of side bar communications 100 using the disclosed system. In one embodiment, as shown in decision block 168, the different types may be divided up initially on whether the type of side bar communication is either a public (or new group) communication or a private communication. If a public (or new group) call is to be formed, block 169 indicates that users 2 and 3 may, at least temporarily, leave the original group conversation 90. Such a public or group call has the capability of allowing other users (even beyond original users 1–4) to join the side bar conversation. This may be beneficial if the participants in the side bar communication wish to consult a third party to the original group communication 90. Thereafter, in process block 170, the server 24 will seek the parameters of the new group being formed much as the server 24 would initially need to do for the original group conversation 90. This may include gathering a list of desired users (e.g., user IDs, or attributes), the topic of the group, how long the new group will be active for, etc. Accordingly, user 2 or 3 (or both) can specify such information to the server 24 using their user interfaces 51 and then the temporary channel is made permanent, just as is the channel used for the original group conversation 90. In establishing a channel, the communication system may associate an ID code for the channel in header information accompanying the audio communication being broadcast. In any event, once the new channel or group is established, as illustrated in process block 172, users 2 and 3 can hold their side bar conversation 100, and perhaps being joined by other users in the process. Regardless of the side bar type chosen, in preferred embodiments, the server 24 will establish an appropriate side bar channel in addition to the already established group channel carrying the original group conversation 90.

If a private call is formed from decision block 168, the system may then form an exclusive communication link between the initiator and recipient (here, users 2 and 3). The system may provide, as shown in decision block 171, a choice between a private voice call or a SMS or text messaging scheme. Note that a similar decision block may also be provided in a public (or new group call) wherein a decision between a voice call or a SMS or text messaging scheme may be selected. In any event, a private voice call is akin to a regular non-group based phone call between the two and which does not permit others to join voluntarily. However, in a private call, the system may allow the initiator or recipient to invite a third part into the private call. In one embodiment, as shown in blocks 173 and 175, the server 24 can create a new voice communication channel for the benefits of users 2 and 3, much in the same way that it would traditionally allow two users to call one another on the network. Otherwise, the server 24 could hand the conversation over to a different less-complex network (not shown) more appropriate for private voice conversations, akin to cell or traditional telephone networks. A SMS (Short Message Service) or other text conversation can be formed (block 177) using simultaneous voice and data communication technology to allow the users 2 and 3 to trade or otherwise exchange messages. As one skilled in the art understands, SMS messages can be used with digital GSM networks and allow text messages of up to 160 characters to be sent and received via the network operator's message center to a user interface or from the Internet using a so-called "SMS gateway" website as an example.

Figure 7:
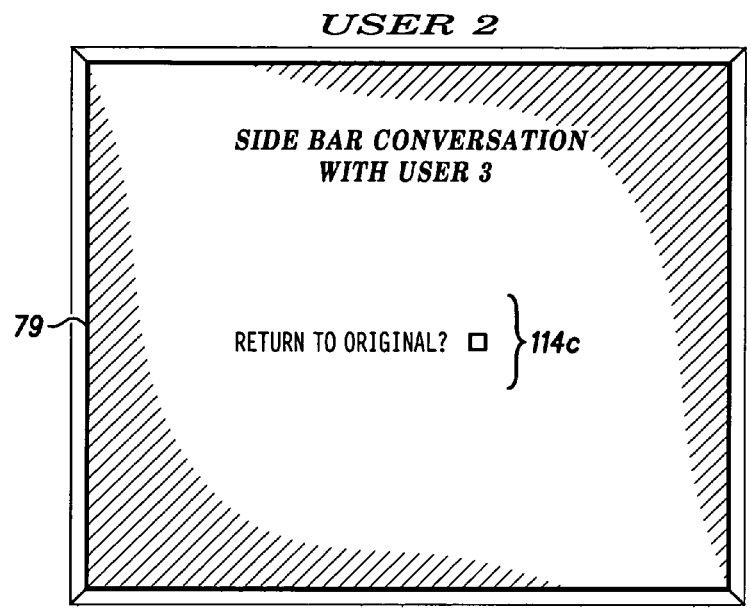
FIG. 7 is a diagram of a display in a user interface that illustrates how one user can return to a group conversation after participating in a side bar conversation.

Regardless of the side bar conversation type chosen, in a preferred embodiment, users participating in the side bar conversation 100 have the option of returning to the original group conversation 90 (block 174), although of course the side bar conversation 100 may also be treated by the server 24 to work a permanent disconnect with the original group conversation 90. This is illustrated in FIG. 7, whereby a touch button screen 114c on the display 79 is used to effectuate the return. Should a user desire a return, the server 24 is so informed and thereafter communications to and from the side bar participants proceeds back to the group conversation 90.

In one embodiment, once users have formed a side bar conversation, users do not have to permanently leave the original group conversation 90. Instead, that conversation continues in the background, preferably at a reduced volume so that the side bar participants can still hear the original group conversation 90, or squelched in and out as dictated by the activities on the side bar, such that the users can join back in a hurry should their inputs be called for in the original call.

Figure 8:
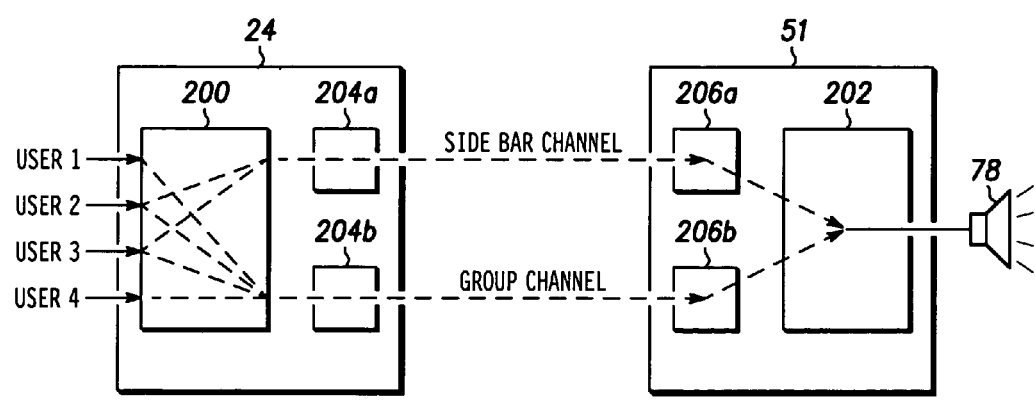
FIG. 8 is a diagram that illustrates how the audio channels for a group and side bar conversations can be modified so that both can be heard simultaneously but with the volume of the group channel reduced.

An audio adjustment with a reduced volume characteristic can be accomplished as shown in FIG. 8. As shown in that figure, audio inputs, preferably in the form of digital data streams, are wirelessly transmitted to the server 24 for all users in the group call. An audio mixer 200 mixes these audio inputs in accordance with the specified channels. Thus the mixer mixes and prioritizes the audio input for all users participating in the group conversation 90 to formulate an audio broadcast to these users along a group channel. Additionally, the mixer mixes the audio inputs for those users participating in the side bar conversation 100 to formulate a side bar channel to be received only by the side bar participants (i.e., users 2 and 3). Ultimately, these channels are both received at the user interfaces 51 of users 2 and 3, wherein they are again mixed at mixer 202 and broadcast through the user interface 51 at speakers 78. However, the group channel is reduced in its volume relative to the side bar channel. This can be accomplished by volume controls located either at the server 24 (204a, 204b) or at the head unit 50 user interface 51 (206a, 206b), which may be automatically set to provide a set amount of volume reduction to the group channel, or which may be user programmable to the same effect.

Figure 9:
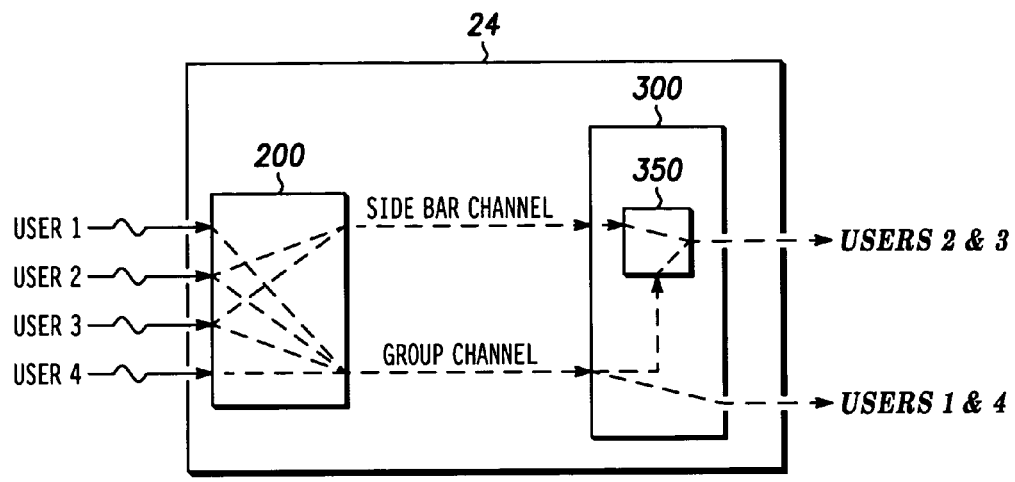
FIG. 9 is a diagram that illustrates how the audio channels for a group and side bar conversations can be modified so that the group conversation is squelched.

In another embodiment, once users have formed a side bar conversation, the original group conversation 90 may be squelched in and out as dictated by the activities on the side bar, such that the users can join back in a hurry should their inputs be called for in the original group call. Here, squelching may include that, if there is a pause in speech between participants to a side bar conversation, the group conversation is audible or audibly louder than when members of the side bar conversation are speaking. FIG. 9 illustrates one method of making such an audio adjustment. As shown, audio inputs, preferably in the form of digital data streams, are wirelessly transmitted to the server 24 for all users in the group call. An audio mixer 200 mixes these audio inputs in accordance with the specified channels. Thus, the mixer mixes the audio input for all users participating in the group conversation 90 to formulate the side bar and group channels. These data streams are then remixed in a second mixer 300 according to user specific criteria. A third mixer and message sequencer 350 may be used to sequence the messages to perform the squelching feature. The users may also program the second mixer 300 criteria at the server 24. For user 2 and 3, the second mixer 300 will mix the side bar and group channel, or squelch the group channel to allow the side bar to be heard. For users 1 and 4, the second mixer 300 will allow the group channel to pass through. The benefit of this approach is that it will allow the receiving end (at the vehicle) to have a single channel receiver.

Figure 10:
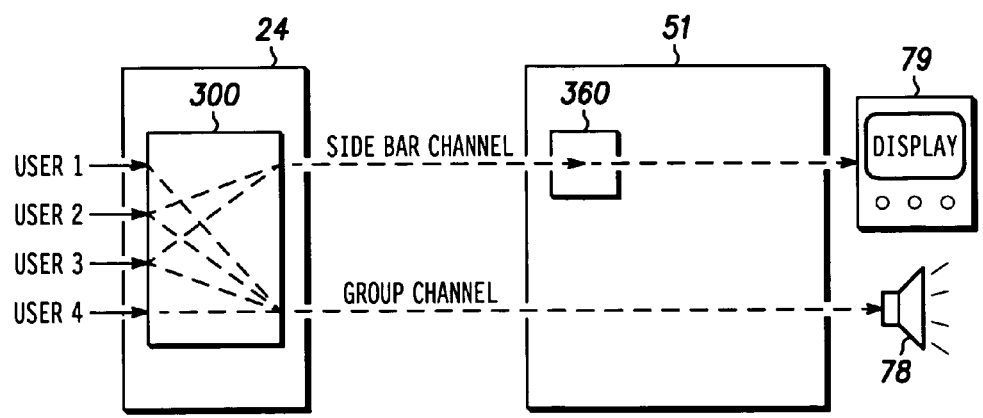
FIG. 10 is a diagram that illustrates how the audio channels for a group and side bar conversations can be modified so that the side bar conversation is converted from an audio format to a text format.

In a further embodiment, once users have formed a side bar conversation, the original group conversation 90 may be audibly heard but the side bar conversation converted to text and displayed on a screen. This also allows side bar conversation users to join back into the group conversation in a hurry should their inputs be required by the entire group. FIG. 10 illustrates one method of making such an audio adjustment to text. As shown, audio inputs, preferably in the form of digital data streams, are wirelessly transmitted to the server 24 for all users in the group call. An audio mixer 200 mixes the audio input for all users participating in the group conversation 90 to formulate the side bar and group channels. In one embodiment, as shown in FIG. 10, the channels are both received by users 2 and 3. The data streams for users 2 and 3 are then converted to text in a voice-to-text converter 360 and may then be passed to the display 79. For audio associated with users 1 and 4, the data stream for the group channel is to pass through to speaker 78. Alternatively, the voice-to-text converter 360 could be located on the server 24 side and the text data for the side bar conversation could be transmitted via a separate data channel.

In another embodiment, once the users have formed a side bar conversation, the controller 56 in the head unit 50 is configured to monitor the original group conversation to determine whether a specific name of a user in the side bar conversation is spoken. For instance, referring to FIG. 10, the controller 56 could monitor the text being generated in the voice-to-text converter 360 and notify a user in the side bar conversation that their name or a key word or phrase was spoken in the original group conversation. This may provide the advantageous benefit of raising the attention of a user in the side bar conversation that their presence is needed back in the group conversation. Moreover, the controller 56 could be configured to record in memory 64, for later playback, a segment of the conversation after the name of a user in the side bar conversation is used in the original group conversation.

While largely described with respect to improving communications within vehicles, one skilled in the art will understand that many of the concepts disclosed herein could have applicability to other portable communicative user interfaces not contained within vehicles, such as cell phones, personal data assistants (PDAs), portable computers, etc., what can be referred to collectively as portable communication devices.

Although several discrete embodiments are disclosed, one skilled in the art will appreciate that the embodiments can be combined with one another, and that the use of one is not necessarily exclusive of the use of other embodiments. Moreover, the above description of the present invention is intended to be exemplary only and is not intended to limit the scope of any patent issuing from this application. The present invention is intended to be limited only by the scope and spirit of the following claims.

What is claimed is:

1. A method of processing a first group conversation in a push-to-talk communication network accessible by a plurality of users each using a user interface, comprising:

allowing at least a first and second user to speak during the first group conversation along a first wireless channel;

allowing the first user to query the second user whether the second user would like to have a second conversation with the first user;

if the second user would like to have a second conversation with the first user, permitting either the first or second user to establish a second wireless channel;

connecting the first and second user along the second wireless channel to enable at least the first and second users to have the second conversation; and modifying for the first and second user the audible characteristic of the first group conversation relative to the second conversation.

2. The method of claim 1, further comprising the step of allowing the first or second user to switch back from the second wireless channel to the first group conversation along the first wireless channel.

3. The method of claim 1, wherein the step of modifying the audible characteristic comprises reducing the volume of the first group conversation.

4. The method of claim 1, wherein the step of modifying the audible characteristic comprises squelching the first group conversation.

5. The method of claim 1, wherein the step of modifying the audible characteristic comprises converting the second conversation to text.

6. The method of claim 1, further comprising the step of disconnecting the first and second users from the first channel when the first and second users are connected along the second wireless channel.

7. The method of claim 1, wherein the second conversation comprises a private conversation between the first and second users.

8. The method of claim 1, wherein the second conversation comprises a second group conversation accessible by other users.

9. The method of claim 1, wherein the second conversation comprises a textual conversation.

10. The method of claim 1, wherein the second conversation comprises a data exchange.

11. The method of claim 1, wherein at least one user interface is integral with a vehicle.

12. The method of claim 1, wherein at least one user interface comprises a portable computer.

13. A method of processing a first group conversation in a push-to-talk communication network accessible by a plurality of users each using a user interface, comprising:

allowing at least a first and second user to speak during the first group conversation along a first wireless channel;

allowing the first user to query the second user whether the second user would like to have a second conversation with the first user;

if the second user would like to have a second conversation with the first user, permitting either the first or second user to establish a second wireless channel;

connecting the first and second user along the second wireless channel to enable at least the first and second users to have the second conversation; and monitoring the first group conversation to determine whether a keyword or a name of the first or second user is spoken in the first group conversation and, if so, notifying the first or second user that the keyword or the name was spoken in the first group conversation.

14. A method of processing a first group conversation in a push-to-talk communication network accessible by a plurality of users each using a user interface, comprising:

allowing at least a first and second user to speak during the first group conversation along a first wireless channel;

allowing the first user to query the second user whether the second user would like to have a second conversation with the first user;

if the second user would like to have a second conversation with the first user, permitting either the first or second user to establish a second wireless channel;

connecting the first and second user alone the second wireless channel to enable at least the first and second users to have the second conversation; and monitoring the first group conversation to determine whether a name of the first or second user is spoken in the first group conversation and, if so, recording a portion of the first group conversation.

15. A method of processing conversations in a push-to-talk communication network accessible by a plurality of users each using a user interface, comprising:

having at least a first and second user participate in a group conversation with other users through their user interfaces and along a first channel;

having the first user use his user interface to request at least one second user to have a side bar conversation with the first user;

if the request is accepted by at least one second user at his user interface, having the communication network form a side bar communication channel; and connecting the first and at least one second user along the side bar communication channel through their user interfaces to enable the side bar conversation between them that is separate from the group conversation; and modifying for the first and at least one second user the audible characteristic of the group conversation relative to the side bar conversation.

16. The method of claim 15, further comprising the step of allowing the first or second user to switch back from the side bar conversation to the group conversation.

17. The method of claim 15, wherein the step of modifying the audible characteristic comprises reducing the volume of the group conversation.

18. The method of claim 15, wherein the step of modifying the audible characteristic comprises squelching the first group conversation.

19. The method of claim 15, wherein the step of modifying the audible characteristic comprises converting the side bar conversation to text.

20. The method of claim 15, it further comprising the step of disconnecting the first and second users from the group conversation when the first and second users are connected along the side bar communication channel.

21. The method of claim 15, wherein the side bar conversation comprises a private conversation between the first and at least one second users.

22. The method of claim 15, wherein the side bar conversation comprises a second group conversation accessible by other users other than initial participants in the side bar conversation.

23. The method of claim 15, wherein the side bar conversation comprises a textual conversation.

24. The method of claim 15, wherein the side bar conversation comprises a data exchange.

25. The method of claim 15, wherein at least one user interface is integral with a vehicle.

26. The method of claim 15, wherein at least one user interface comprises a portable computer.

27. A method of processing conversations in a push-to-talk communication network accessible by a plurality of users each using a user interface comprising:

having at least a first and second user participate in a group conversation with other users through their user interfaces and along a first channel;

having the first user use his user interface to request at least one second user to have a side bar conversation with the first user;

if the request is accepted by at least one second user at his user interface, having the communication network form a side bar communication channel;

connecting the first and at least one second user along the side bar communication channel through their user interfaces to enable the side bar conversation between them that is separate from the group conversation; and monitoring the group conversation to determine whether a keyword or a name of the first or second user is spoken in the group conversation and, if so, notifying the first or second user that the keyword or name was spoken in the group conversation.

28. A method of processing conversations in a push-to-talk communication network accessible by a plurality of users each using a user interface, comprising:

having at least a first and second user participate in a group conversation with other users through their user interfaces and along a first channel;

having the first user use his user interface to request at least one second user to have a side bar conversation with the first user;

if the request is accepted by at least one second user at his user interface, having the communication network form a side bar communication channel;

connecting the first and at least one second user along the side bar communication channel through their user interfaces to enable the side bar conversation between them that is separate from the group conversation; and monitoring the group conversation to determine whether a name of the first or second user is spoken in the group conversation and, if so, recording a portion of the group conversation.

29. A method for operating a server for processing conversations in a push-to-talk communication network, wherein the server wirelessly communicates with a plurality of users each using a user interface, comprising:

having the server couple a first and at least one second user in a group conversation with other users through their user interfaces and along a first channel;

receiving from the first user's user interface a request to invite at least one second user to have a side bar conversation with the first user;

receiving from the second user's user interface acceptance of the request;

forming at the server a side bar communication channel;

connecting the first and at least one second user along the side bar channel through their user interfaces to enable the side bar conversation between them that is separate from the group conversation; and modifying for the first and at least one second user the audible characteristic of the group conversation relative to the side bar conversation.

30. The method of claim 29, further comprising the step of receiving instruction from the first or second user to switch back from the side bar conversation to the group conversation.

31. The method of claim 29, wherein the step of modifying the audible characteristic comprises reducing the volume of the group conversation.

32. The method of claim 29, wherein the step of modifying the audible characteristic comprises squelching the first group conversation.

33. The method of claim 29, wherein the step of modifying the audible characteristic comprises converting the side bar conversation to text.

34. The method of claim 29, further comprising the step of disconnecting the first and second users from the group conversation when the first and second users are connected along the side bar channel.

35. The method of claim 29, wherein the side bar conversation comprises a private conversation between the first and at least one second users.

36. The method of claim 29, wherein the side bar conversation comprises a second group conversation accessible by other users other than initial participants in the side bar conversation.

37. The method of claim 29, wherein the side bar conversation comprises a textual conversation.

38. The method of claim 29, wherein the side bar conversation comprises a data exchange.

39. The method of claim 29, wherein at least one user interface is integral with a vehicle.

40. The method of claim 29, wherein at least one user interface comprises a portable computer.

41. A method for operating a server for processing conversations in a push-to-talk communication network, wherein the server wirelessly communicates with a plurality of users each using a user interface, comprising:

having the server couple a first and at least one second user in a group conversation with other users through their user interfaces and along a first channel;

receiving from the first user's user interface a request to invite at least one second user to have a side bar conversation with the first user;

receiving from the second user's user interface acceptance of the request;

forming at the server a side bar communication channel;

connecting the first and at least one second user along the side bar channel through their user interfaces to enable the side bar conversation between them that is separate from the group conversation; and monitoring the group conversation to determine whether a name of the first or second user is spoken in the group conversation and, if so, notifying the first or second user that the name was spoken in the group conversation.

42. A method for operating a server for processing conversations in a push-to-talk communication network, wherein the server wirelessly communicates with a plurality of users each using a user interface, comprising:

having the server couple a first and at least one second user in a group conversation with other users through their user interfaces and along a first channel;

receiving from the first user's user interface a request to invite at least one second user to have a side bar conversation with the first user;

receiving from the second user's user interface acceptance of the request;

forming at the server a side bar communication channel;

connecting the first and at least one second user along the side bar channel through their user interfaces to enable the side bar conversation between them that is separate from the group conversation; and monitoring the group conversation to determine whether a name of the first or second user is spoken in the group conversation and, if so, recording a portion of the group conversation.

* * * * *

UNITED STATES PATENT AND TRADEMARK OFFICE
CERTIFICATE OF CORRECTION

| | |
|---|---|
| PATENT NO. | : 7,062,286 B2 |
| APPLICATION NO. | : 10/818267 |
| DATED | : June 13, 2006 |
| INVENTOR(S) | : Grivas et al. |

Page 1 of 1

It is certified that error appears in the above-identified patent and that said Letters Patent is hereby corrected as shown below:

On the Title page of the patent, item 75 change the Inventor city for Nick B. Grivas from "Harvard, IL" to --Crystal Lake, IL--

Col. 11, Line 30, change "alone" to --along--

Col. 12, Line 1, delete "it"

Signed and Sealed this

Thirtieth Day of January, 2007

JON W. DUDAS
*Director of the United States Patent and Trademark Office*